P. C. BOOZER.
NUT LOCK.
APPLICATION FILED OCT. 15, 1917.

1,277,037.

Patented Aug. 27, 1918.

WITNESSES
Guy M. Spring
Sterling P. Buck

INVENTOR
P. C. Boozer

BY Richard B. Owen

ATTORNEY

UNITED STATES PATENT OFFICE.

PETER C. BOOZER, OF MAYPORT, PENNSYLVANIA.

NUT-LOCK.

1,277,037.

Specification of Letters Patent. Patented Aug. 27, 1918.

Application filed October 15, 1917. Serial No. 196,698.

*To all whom it may concern:*

Be it known that I, PETER C. BOOZER, a citizen of the United States, residing at Mayport, in the county of Clarion and State of Pennsylvania, have invented certain new and useful Improvements in Nut-Locks, of which the following is a specification.

This invention relates to rail joints and it relates more particularly to an improved form of nut lock for railway rail joints.

The primary object of this invention is to provide a perfectly secure and efficient means of locking the nuts which coöperate with the bolts and fish plates of a railway joint in holding the meeting ends of the rails together.

A further object of the invention is to provide a nut locking arrangement of this character which may be very quickly and easily removed for allowing the nuts to be removed when desired.

Another object is to provide a device of this character in which the travel of the car and engine wheels along the track effectively prevent accidental disengagement or disablement of the nut locking device.

Another object of the invention is to provide a device of this character which may be used in connection with the ordinary form of rails and fish plates without changing the form of either rail or either fish plate.

Another object is to provide a device of this character which is very practical, convenient, strong, durable, simple of construction, and comparatively inexpensive. Other objects and advantages may become apparent to persons who read the following details of construction in connection with the accompanying drawings in which.

Figure 1:
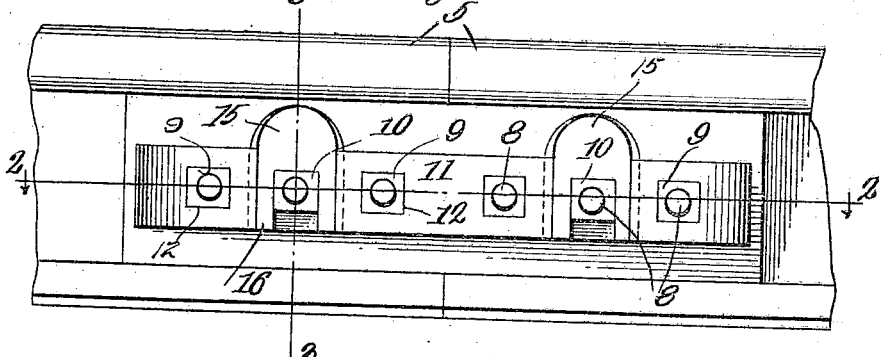
Figure 1 is a side elevation of my improved nut locking device in its normal position and a fish plate which connects the meeting ends of a pair of rails.
Figure 2:
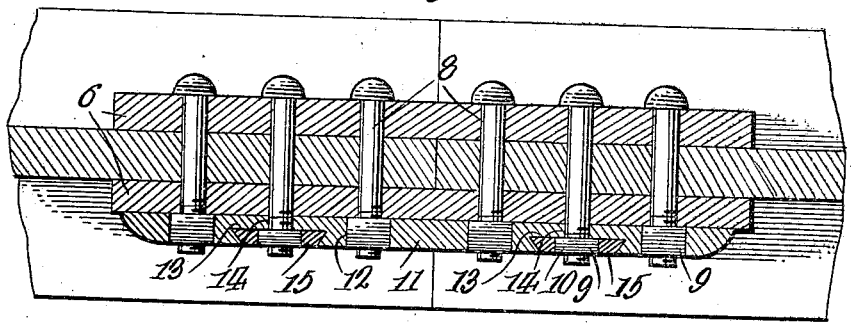
Fig. 2 is a horizontal sectional view taken along the line 2—2 of Fig. 1.
Figure 3:
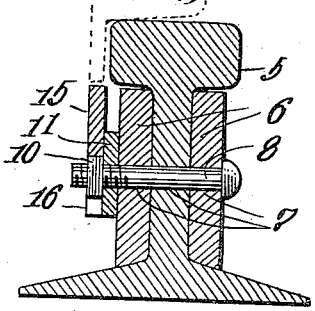
Fig. 3 is a transverse vertical sectional view taken along the line 3—3 of Fig. 1.

In these drawings, in which similar reference characters correspond with similar parts throughout the several views; the rails, being of ordinary and counterpart construction, are each designated by the numeral 5. The fish plates, being of ordinary and counterpart construction, are each designated by the numeral 6. These fish plates and rails are provided with the usual alined or registering apertures 7 through which extend bolts 8, all of which may be of counterpart construction. The nuts 9 and 10 may be of counterpart construction, although I have shown the nuts 10 somewhat thinner than the nuts 9.

The major element of my invention consists of a bar or plate 11 which is formed with a series of rectangular apertures 12.

The plate 11 is formed with one or more dovetailed or outwardly converging recesses 13 extending transversely and entirely thereacross. One or more apertures 14 extend through the relatively thin portion of the plate 11 and communicate with the central portion of each recess 13. These apertures are preferably cylindrical and but slightly larger in diameter than the bolts 8, so that certain of the bolts extend therethrough and engage with the respective nut 10. Any ordinary or suitable means may be provided for preventing the bolts from turning with respect to the rails and fish plates, and when these parts are assembled, the nuts should be turned with their imperforate sides standing vertically and horizontally, respectively.

It will be seen that the plate 11 prevents the nuts 9 from turning, while the nuts 10 are only prevented by friction from being turned, until the locking device is completed by the provision and application of the bifurcated and bevel-edged members or plates 15. These plates 15 are substantially equal in width to the dovetailed recesses, and the distance between the furcations 16 of each plate 15 is substantially equal to the length of each of the imperforate sides of the nuts 10. Therefore, it will be seen that these plates 15 may be inserted in the dovetailed recesses so as to straddle the adjacent nut 10 and embrace the latter so as to prevent it from turning on its bolt.

Each plate 15 is extended outward approximately to the head of the adjacent rail 5, so that each time a car wheel rolls along said head, its flange moves approximately into contact with the upward extension when the plate 15 is properly seated. However, if one of the plates 15 works slightly upward, the movement of the wheel flange thereover presses it back into its operative position. It will be seen therefore, that the tendency of the plates 15 to be dislodged by the jar of the train is overcome by the pressure of the wheel flanges, thereby rendering it impossible for these plates to become disengaged, and thus rendering it impossible for the plate 11 to become accidentally misplaced or for any of the nuts to become accidentally rotated or loosened.

It will be seen, therefore, that I have provided a device of great utility and of great importance as a means for preventing accidents such as are so common in consequence of displaced rail joint fastenings.

What I claim as my invention is:

1. A nut lock for rail joints, comprising a plate having a plurality of nut receiving openings, a bolt opening and a recess in its outer side intersecting the bolt opening and adapted to receive a nut, and a locking member slidable vertically into said recess and having its upper end adapted to be engaged by a car wheel whereby to depress the said member and prevent its displacement.

2. The combination with the meeting ends of railway rails, and fish plates in lapped relation thereto, said fish plates and rails being provided with alined apertures, of bolts through certain of said apertures, nuts on said bolts, a locking plate provided with apertures to receive and prevent the turning of said nuts, said locking plate being provided with another aperture, a bolt extending through certain alined apertures of said rails and fish plates and through said other aperture of said locking plate, said locking plate being provided with a recess in communication with said other aperture, a nut fitted on the last said bolt and disposed in said recess, said recess being provided with outwardly converging walls, and a bifurcated member having beveled sides and being fitted between said outwardly converging walls and over the last said nut so as to prevent turning of the nut.

3. The combination with the meeting ends of railway rails, and fish plates in lapped relation thereto, said fish plates and rails being provided with alined apertures, of bolts through certain of said apertures, nuts on said bolts, a locking plate provided with apertures to receive and prevent the turning of said nuts, said locking plate being provided with another aperture, a bolt extending through certain alined apertures of said rails and fish plates and through said other aperture of said locking plate, said locking plate being provided with a recess in communication with said other aperture, a nut fitted on the last said bolt and disposed in said recess, and a locking member slidable vertically into said recess and held therein against lateral displacement, and having its upper end extended to adapt it to be depressed by a car wheel and prevent vertical displacement of the locking member.

In testimony whereof I affix my signature in presence of two witnesses.

PETER C. BOOZER.

Witnesses:
JOHN L. REITZ,
C. D. SHICK.

Copies of this patent may be obtained for five cents each, by addressing the "Commissioner of Patents, Washington, D. C."